June 17, 1969 E. U. COHLER 3,451,046
ELECTRO-ELASTIC MEMORY
Filed Aug. 19, 1965
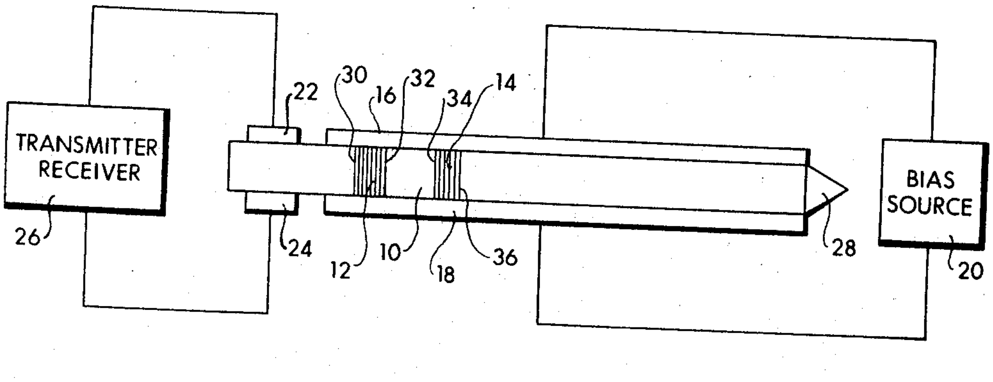
INVENTOR
EDMUND U. COHLER
BY Stanley M. Schurgin
ATTORNEY 3,451,046

ELECTRO-ELASTIC MEMORY

Edmund U. Cohler, Brookline, Mass., assignor to Sylvania Electric Products Inc., a corporation of Delaware Filed Aug. 19, 1965, Ser. No. 480,936
Int. Cl. G11b *5/12;* H03k *7/30*
U.S. Cl. 340—173 5 Claims

ABSTRACT OF THE DISCLOSURE

The change in an electric constant of a ferroelectric material with polarization is utilized to provide a memory element. Data is recorded in the memory by the coincidence of a sonic signal and an electric field to polarize a region in the ferroelectric material. Data is read by applying a single sonic input signal to the ferroelectric material and detecting a reflected signal when the sonic signal crosses a boundary denoted by a change of the polarization state of the ferroelectric material.

This invention relates to electronic data storage and more particularly to electro-elastic memories.

Ferroelectric materials have been employed for data storage; however, writing and readout has generally been accomplished through electrical properties of the ferroelectric. In addition, accessing has been accomplished electircally by conductor matrix techniques employing electrode configurations and addressing logic which are quite complicated in memories of practical size.

In accordance with the present invention, the change in an elastic constant of a ferroelectric with the polarization of the material is utilized to provide a memory. Data is recorded in memory by the coincidence of a sonic signal and an electrical field which produces a polarized region in the ferroelectric material which is representative of the stored data. The polarized region exhibits a different sonic impedance than an unpolarized region. Data is read by applying a single sonic input signal to the ferroelectric which is reflected from the impedance discontinuities between regions of unlike polarization to produce a sequence of pulses repesentative of the stored data.

The invention will be more fully understood from the following detailed description, taken in conjunction with the drawing, the single figure of which is a greatly exaggerated elevation view of a memory embodying the present invention.

Certain ferroelectric materials exhibit elastic constants which are dependent upon the polarization state of the material. A description of this behavior is given in The Dependence of Elastic Constants on Polarization in a Ferroelectric Ceramic, IEEE Transactions on Sonics and Utrasonics, volume SU–12, No. 1, p. 5. Change in the elastic constant causes a corresponding change in the characteristic sonic impedance of the material. A sonic wave propagating through the material will, therefore, be partially reflected by boundaries between regions of unlike polarization where a change in impedance is experienced. If regions of one polarization represent binary ONES and those of another polarization represent binary ZEROES, the reflected waves will be a series of pulses representative of information encoded as polarized and unpolarized regions. Thus, data can be read out of a ferroelectric memory without destroying the stored data.

Selected regions of the ferroelectric can be polarized by coincidentally applying a stress signal and a biasing field. The switching threshold of the ferroelectric is reduced in the presence of stress so that a bias field, which alone is of insufficient magnitude to polarize the material, can now polarize the material.

The invention is embodied in the illustrated memory which includes a rectangular slab of piezo-ferroelectric material 10, such as lead zirconate titanate, polarized in regions 12 and 14, having a pair of bias electrodes 16 and 18 disposed on respective opposite faces thereof along most of its length, and connected to a bias source 20. A pair of input-output electrodes 22 and 24 are also disposed on respective opposite faces of one end of slab 10 and are connected to a transmitter-receiver 26. An absorptive termination 28, such as lead, is provided on the other end of slab 10 to absorb unreflected energy reaching the end of the line. To polarize selected regions of slab 10, and thereby write data into memory, a sequence of pulses is applied by transmitter 16 via electrodes 22 and 24 to slab 10, causing a corresponding series of sonic pulses to propagate therethrough. When all pulses have propagated into slab 10, a biasing field is applied via bias source 20 and electrodes 16 and 18, which, together with the effect produced by the stress pulses, is sufficient to polarize the desired regions of slab 10, for example, regions 12 and 14. The magnitudes of the bias field and stress pulses are such that neither alone exceeds the polarizing threshold of the material, but together are of sufficient magnitude to polarize the material. Alternatively, a single sonic pulse can be transmitted through slab 10 and a biasing field applied sequentially as the sonic pulse arrives at selected positions in the slab to thereby polarize these positions.

To read information from the memory, a pulse is applied by transmitter 26 via electrodes 22 and 24 to slab 10, causing a sonic pulse to propagate down the slab. This pulse is partially reflected at the boundaries of the polarized sections, for example at 30, 32, 34 and 36, due to the discontinuity in the sonic impedance at these points. The reflected pulses generate corresponding voltage pulses across electrodes 22 and 24 which are detected by receiver 26. The pulse reaching the end of slab 10 is absorbed by termination 28. The reflected pulses are representative of the data stored in the memory and do not destroy the stored data content. Non-desrtuctive readout is thereby achieved, yet the memory is electrically alterable by applying bias and write fields, in the manner described hereinabove.

The ferroelectric material need not be piezoelectric, although the piezoelectric effect affords an expedient way to initiate a stress wave, but, rather, stress could be generated by an attached transducer to produce a sonic wave in the ferroelectric material. Most known ferroelectric materials exhibit piezoelectric properties; therefore, the illustrated embodiment would probably be the most practical at the present time.

The ferroelectric material can also be selectively polarized along different axes, rather than polarized only in one direction. In this manner, a plurality of reflected signals are produced which are representative of the sense of polarization and which would be indicative of several bits of data, rather than just binary ONES and ZEROES.

From the foregoing, it is evident that an electrically alterable, non-destructive memory has been provided which utilizes the electro-elastic properties of a ferroelectric material. The invention is not to be limited by what has been partticularly shown and described, except as indicated in the appended claims.

What is claimed is:

1. An electro-elastic memory comprising a slab of ferroelectric material, means for polarizing selected areas of said material, means for propagating a sonic pulse within said material, and means for detecting sonic pulses reflected from the polarized areas of said material.

2. An electro-elastic memory comprising a slab of ferroelectric material having selected polarized areas, means for propagating a sonic pulse within said slab, and means for detecting sonic pulses reflected from the polarized areas of said slab.

3. An electro-elastic memory comprising a slab of piezoferroelectric material, means for polarizing selected areas of said material, means for propagating a sonic pulse within said material, and means for detecting sonic pulses reflected from the polarized areas of said material.

4. A memory according to claim 3 wherein said polarizing means includes means for coincidently applying a sonic signal and a biasing field to the selected areas of said slab of piezoferroelectric material.

5. An electro-elastic memory comprising, an elongated rectangular slab of piezoferroelectric material having a first pair of electrodes disposed on respective opposite faces on one end and a second pair of electrodes disposed on respective opposite faces substantially coextensive with said slab, an acoustic absorber disposed on the end of said slab opposite to said first pair of electrodes, a source of drive potential connected to said first air of electrodes, said source of drive potential being operable to supply a signal for propagation along said elongated rectangular slab of piezoferroelectric material; and a source of bias potential connected to said second pair of electrodes said source of bias potential being operative to establish a field between said second pair of electrodes such that the coincidence of the field between said second pair of electrodes and the signal from said drive source causes a change in the polarization of the slab at the point of coincidence.

References Cited

UNITED STATES PATENTS

| | | | |
|---|---|---|---|
| 3,127,578 | 3/1964 | Long | 333—30 |
| 3,132,257 | 5/1964 | Yando | 307—88 |
| 3,320,596 | 5/1967 | Smith | 340—174 |

TERRELL W. FEARS, *Primary Examiner.*

U.S. Cl. X.R.

333—30